(12) United States Patent
Wilson et al.

(10) Patent No.: US 8,775,316 B2
(45) Date of Patent: Jul. 8, 2014

(54) WAGERING GAME WITH ENCRYPTION AND AUTHENTICATION

(75) Inventors: Timothy D. Wilson, Oak Park, IL (US); Jason A. Smith, Vernon Hills, IL (US); Nevin J. Liber, Libertyville, IL (US); Mark B. Gagner, West Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 176 days.

(21) Appl. No.: 13/083,261

(22) Filed: Apr. 8, 2011

(65) Prior Publication Data

US 2011/0183748 A1 Jul. 28, 2011

Related U.S. Application Data

(63) Continuation of application No. 11/996,243, filed as application No. PCT/US2006/028219 on Jul. 20, 2006, now abandoned.

(60) Provisional application No. 60/700,943, filed on Jul. 20, 2005, provisional application No. 60/728,444, filed on Oct. 20, 2005.

(51) Int. Cl.
*G06F 21/00* (2013.01)
*H04L 9/32* (2006.01)

(52) U.S. Cl.
USPC ............................................ 705/51; 713/175

(58) Field of Classification Search
USPC ............... 463/29, 43; 700/91–93; 705/18, 59; 713/168
See application file for complete search history.

(56) References Cited

U.S. PATENT DOCUMENTS

| | | | |
|---|---|---|---|
| 5,673,319 A | 9/1997 | Bellare et al. | |
| 5,724,425 A | 3/1998 | Chang et al. | |
| 6,902,481 B2 | 6/2005 | Breckner et al. | |
| 6,918,035 B1 | 7/2005 | Patel | |
| 7,082,200 B2 | 7/2006 | Aboba et al. | |
| 7,178,025 B2 | 2/2007 | Scheidt et al. | |
| 7,290,072 B2 | 10/2007 | Quraishi et al. | |
| 7,338,372 B2 * | 3/2008 | Morrow et al. | 463/31 |
| 7,515,718 B2 | 4/2009 | Nguyen et al. | |
| 7,536,544 B2 * | 5/2009 | Xiao | 713/158 |
| 7,549,922 B2 | 6/2009 | Falvey et al. | |
| 7,760,876 B2 | 7/2010 | Kocher et al. | |

(Continued)

FOREIGN PATENT DOCUMENTS

| | | | | |
|---|---|---|---|---|
| EP | 1509023 A1 * | 2/2005 | ............. | H04L 29/06 |
| WO | WO-2007012035 A2 | 1/2007 | | |
| WO | WO-2007012035 A3 | 1/2007 | | |

OTHER PUBLICATIONS

"U.S. Appl. No. 11/996,243, Non Final Office Action mailed Dec. 8, 2010", 18 pgs.

(Continued)

*Primary Examiner* — Evens J Augustin
(74) *Attorney, Agent, or Firm* — Nixon Peabody LLP

(57) ABSTRACT

A computerized wagering game system includes a gaming module comprising gaming code which is operable when executed on to conduct a wagering game on which monetary value can be wagered, and a security module operable to perform at least one encryption function on information communicated via a network connection. The encryption functions include in various embodiments key management, authentication, or other encryption functions such as symmetric, asymmetric, hash, or message authentication code functions.

24 Claims, 9 Drawing Sheets

(56) References Cited

U.S. PATENT DOCUMENTS

| | | |
|---|---|---|
| 2001/0021252 A1 | 9/2001 | Carter et al. |
| 2002/0029200 A1* | 3/2002 | Dulin et al. .................. 705/67 |
| 2002/0116615 A1 | 8/2002 | Nguyen et al. |
| 2002/0138735 A1 | 9/2002 | Felt et al. |
| 2002/0169953 A1* | 11/2002 | Moharram et al. ........... 713/151 |
| 2003/0023848 A1* | 1/2003 | Wray ............................ 713/175 |
| 2003/0064771 A1* | 4/2003 | Morrow et al. ................ 463/16 |
| 2003/0078103 A1 | 4/2003 | LeMay et al. |
| 2004/0039911 A1* | 2/2004 | Oka et al. ..................... 713/175 |
| 2004/0092310 A1 | 5/2004 | Brosnan et al. |
| 2004/0259633 A1 | 12/2004 | Gentles et al. |
| 2005/0201342 A1 | 9/2005 | Wilkinson et al. |
| 2006/0035713 A1* | 2/2006 | Cockerille et al. ............. 463/42 |
| 2006/0073890 A1 | 4/2006 | McAllister et al. |
| 2007/0060361 A1* | 3/2007 | Nguyen et al. ................. 463/42 |
| 2010/0197376 A1 | 8/2010 | Kerr |
| 2010/0203960 A1 | 8/2010 | Wilson et al. |

OTHER PUBLICATIONS

Rivest, et al., "How to Expose an Eavesdropper", Communications of the ACM, vol. 27, No. 4, (Apr. 1984), 393-395.

* cited by examiner

Certificate:
  Data:
    601 ~ Version: 1 (0x0)
      Serial Number : 7829 (0x1e95)
    602 ~ Signature Algorithm: md5WithRSAEncryption
    603 ~ Issuer: C=ZA, ST=Western Cape, L=Cape Town, O=Thawte Consulting cc,
        OU=Certification Services Division,
        CN=Thawte Server CA/Email=server-certs@thawte.com
    604 ~ Validity
      Not Before: Jul 9 16:04:02 1998 GMT
      Not After : Jul 9 16:04:02 1999 GMT
    605 ~ Subject: C=US, ST=New Yor, L=New York O=Mr. Owner
        OU=Acme Co., CN=www.company.org/Email=xxx@company.org
    606 ~ Subject Public Key Info:
      Public Key Algorithm: rsaEncryption
      RSA Public Key: (1024 bit)
        Modulus (1024 bit):
          00:b4:31:98:0a:c4:bc:62:c1:88:aa:dc:b0:c8:bb:
          33:35:19:d5:0c:64:b9:3d:41:b2:96:fc:f3:31:e1:
          66:36:d0:8e:56:12:44:ba:75:eb:e8:1c:9c:5b:66:
          70:33:52:14:c9:ec:4f:91:51:70:39:de:53:85:17:
          16:94:6e:ee:f4:d5:6f:d5:ca:b3:47:5e:1b:0c:7b:
          c5:cc:2b:6b:c1:90:c3:16:31:0d:bf:7a:c7:47:77:
          8f:a0:21:c7:4c:d0:16:65:00:c1:0f:d7:b8:80:e3:
          d2:75:6b:c1:ea:9e:5c:5c:ea:7d:c1:a1:10:bc:b8:
          e8:35:1c:9e:27:52:7e:41:8f
        Exponent: 65537 (0x10001)
    607 ~ Signature Algorithm: md5WithRSAEncryption
      93:5f:8f:5f:c5:af:bf:0a:ab:a5:6d:fb:24:5f:b6:59:5d:9d:
      92:2e:4a:1b:8b:ac:7d:99:17:5d:cd:19:f6:ad:ef:63:2f:92:
      ab:2f:4b:cf:0a:13:90:ee:2c:0e:43:03:be:f6:ea:8e:9c:67:
      d0:a2:40:03:f7:ef:6a:15:09:79:a9:46:ed:b7:16:1b:41:72:
      0d:19:aa:ad:dd:9a:df:ab:97:50:65:f5:5e:85:a6:ef:19:d1:
      5a:de:9d:ea:63:cd:cb:cc:6d:5d:01:85:b5:6d:c8:f3:d9:f7:
      8f:0e;fc:ba:1f:34:e9:96:6e:6c:cf:f2:ef:9b:bf:de:b5:22:
      68:9f

*Fig. 6*

WAGERING GAME WITH ENCRYPTION AND AUTHENTICATION

RELATED APPLICATIONS

This application is a continuation of U.S. patent application Ser. No. 11/996,243, filed Jan. 18, 2008 now abandoned, which is a U.S. National Stage Filing under 35 U.S.C. 371 from International Patent Application Ser. No. PCT/US2006/028219, filed Jul. 20, 2006, and published on Jan. 25, 2007 as WO 2007/012035 A2, and republished as WO 2007/012035 A3, which claims the priority benefit under 35 U.S.C. 119(e) of U.S. Provisional Application Ser. No. 60/700,943, filed Jul. 20, 2005, and of U.S. Provisional Application Ser. No. 60/728,444, filed Oct. 20, 2005, the contents of which are incorporated herein by reference in their entireties.

FIELD OF THE INVENTION

The invention relates generally to computerized wagering game machines, and more specifically to a wagering game machine utilizing encryption, authentication, and key management.

COPYRIGHT

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006 WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio and video features into wagering games to present the wagering game, to provide help, and to enhance the environment presented are therefore important elements in the attractiveness and commercial success of a computerized wagering game system. It is not uncommon for audio voices to provide instruction and help, and to provide commentary on the wagering game being played. Music and environmental effects are also played through speakers in some wagering game systems to enhance or complement a theme of the wagering game. These sounds typically accompany video presentation of the wagering game on a screen, which itself often includes animation, video, and three-dimensional graphics as part of presentation of the wagering game.

Modern wagering game system also typically employ a network connection enabling each wagering game machine to communicate with other computerized systems on the network. For example, a progressive area slot controller will coordinate the progressive slot jackpot and coordinate selection of a winner by communicating with each wagering game machine that is a part of the progressive jackpot pool. Computers are used for other purposes, such as for accounting, for tracking rates of game play, and for receiving service requests or malfunction notification. The wagering game machine can be the recipient of information, such as where configuration information like an audio volume level is sent or specified via the network connection. Software updates such as new multimedia files, new game code, operating system changes, and other such data can also be sent via the network connection to a wagering game machine.

But, because significant amounts of money are being wagered on the wagering game machines, the security of network communications is an important consideration. A cheat who is able to intercept or falsify messages on the network could conceivably change the operation or configuration of wagering game machines, as well as interfere with accounting for specific wagering game machines or progressive slot machine controllers.

It is therefore desirable to ensure secure communication between a wagering game machine and other computerized systems in a network.

SUMMARY

One example embodiment of the invention comprises a computerized wagering game system including a gaming module comprising gaming code which is operable when executed on to conduct a wagering game on which monetary value can be wagered, and a security module operable to perform at least one encryption function on information communicated via a network connection. The encryption functions include in various embodiments key management, authentication, or other encryption functions such as symmetric, asymmetric, hash, or message authentication code functions. Some further embodiments include encryption of network packets such as via the IPSec Internet security protocol.

BRIEF DESCRIPTION OF THE FIGURES

FIG. 6 is an example X.509 certificate, consistent with some example embodiments of the invention.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
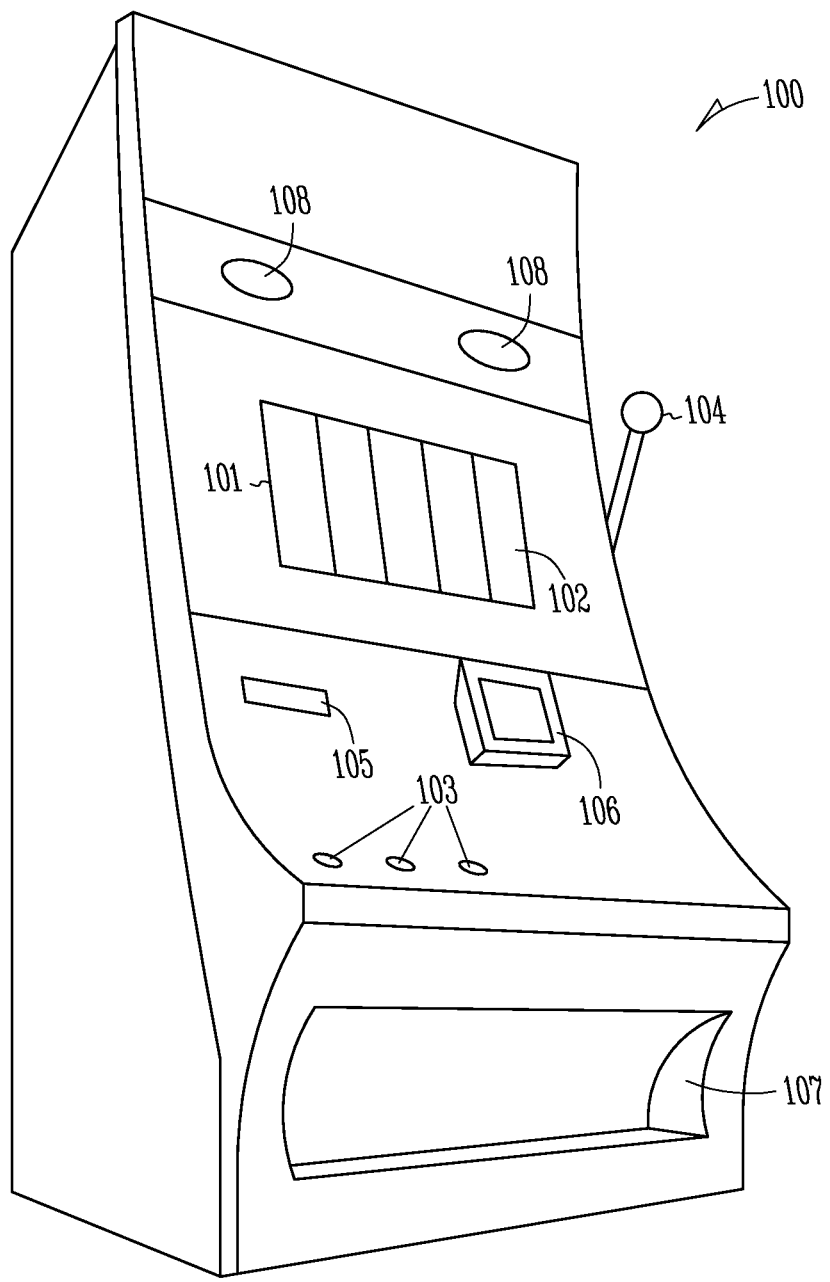
FIG. 1 shows a computerized wagering game machine, as may be used to practice some example embodiments of the invention.

One example embodiment of the invention comprises a computerized wagering game system including a gaming module comprising gaming code which is operable when executed on to conduct a wagering game on which monetary value can be wagered, and a security module operable to perform at least one encryption function on information communicated via a network connection. The encryption functions include in various embodiments key management, authentication, or other encryption functions such as symmetric, asymmetric, hash, digital signature, or message authentication code functions. Some further embodiments include encryption of network packets such as via the IPSec Internet security protocol FIG. 1 illustrates a computerized wagering game machine, as may be used to practice some embodiments of the present invention. The computerized gaming system shown generally at 100 is a video wagering game system, which displays information for at least one wagering game upon which monetary value can be wagered on video display 101. Video display 101 is in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 102 that comprise a part of a video slot machine wagering game.

A game of chance is implemented using software within the wagering game, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold >em games. The wagering game is played and controlled with inputs such as various buttons 103 or via a touchscreen overlay to video screen 101. In some alternate examples, other devices such as pull arm 104 used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 105 or a secure user identification module interface 106, and winnings are returned via the returned value card or through the coin tray 107. Sound is also provided through speakers 108, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions.

The network connection is operable in some embodiments of the invention to receive and transmit information that is desirably confidential, or that would benefit from authentication of the message or the sender. Examples include a wagering game system sending accounting information to a central accounting server, or a progressive slot machine controller tracking the amount wagered on wagering machines in the progressive area network for calculation of the progressive jackpot. Various embodiments of the invention use encryption techniques, such as message authentication, key management, hash functions, and other methods to ensure the security or authenticity of information communicated over the wagering game network.

Protection of the wagering game data takes different forms in varying embodiments of the invention, including but not limited to various symmetric algorithms, public key algorithms, and one-way hash functions. Various embodiments of the invention rely on algorithms such as these being implemented in hardware or in software in the wagering game systems and in other systems such as servers or controllers, such as within a software driver executing on each system in the wagering game network.

Further embodiments encrypt network data sent between two wagering game systems using a protocol that operates on the network interface level, such as SSL or Secure Socket Layer, which is a secure protocol that supports a variety of encryption algorithms and functions, or IPSec, which includes encryption, authentication, and key management protocols. Every packet of information that is exchanged between two systems can be encrypted after a secure connection is established using a network security protocol such as these, making them particularly well-suited for certain wagering game system network environments.

Encryption of data typically takes place with a symmetric or asymmetric algorithm, designed to obscure the data such that a specific key is needed to read or alter the data. A symmetric algorithm relies on agreement of a secret key before encryption, and the decryption key is either the same as or can be derived from the encryption key. Secrecy of the key or keys is vital to ensuring secrecy of the data in such systems, and the key must be securely distributed to the receivers before decryption such as via a secure key exchange protocol. Common symmetric algorithms include DES, 3DES or triple-DES, AES, Blowfish, Twofish, IDEA, RD2, RC4, and RC5.

Public key algorithms, or asymmetric algorithms, are designed so that the decryption key is different than and not easily derivable from the encryption key. The term "public key" is used because the encryption key can be made public without compromising the security of data encrypted with the encryption key. Anyone can therefore use the public key to encrypt a message, but only a receiver with the corresponding decryption key can decrypt the encoded data. The encryption key is often called the public key, and the decryption key is often called the private key in such systems. Such systems can also be used to digitally sign a document where the signer uses the secret private key to encrypt the document or some portion of it such as a one-way hash of the document, and then publishes the encrypted message. Anyone can use the signer's published or known public key to decrypt the signed message, confirming that it was encrypted or signed by the owner of the public/private key pair. Common public key algorithms include RSA, Diffie-Hellman, and ElGamal.

One-way hash functions take an input string and derive a fixed length hash value. The hash value is typically of significantly shorter length than the input string message, and is often calculated by application of some type of lossy data compression algorithm. The functions are designed so that it is extremely difficult to produce an input string that produces a certain hash value, resulting in a function that is considered one-way. Data can therefore be checked for authenticity by verifying that the hash value resulting from a given one-way hash function is what is expected, making authentication of data relatively certain. Hash functions can be combined with other methods of encryption or addition of secret strings of text in the input string to ensure that only the intended parties can encrypt or verify data using the one-way hash functions. Common examples of one-way hash function encryption include MD2, MDC2, MD4, MD5, and SHA.

A variation on one-way hash functions is use of Message Authentication Codes, or MAC. A MAC comprises a one-way hash function that further includes a secret key, such that knowledge of the key is necessary to encode or verify a given set of data. MACs are particularly useful where the hash value would otherwise be subject to unauthorized alteration or replacement, such as when transmitted over a public network or a network that would be difficult to protect, such as a very large network linking hundreds of computerized wagering game machines in a large gaming facility. Examples of message authentication code algorithms include HMAC algorithms such as HMAC-MD5, HMAC-SHA1, and other such hash function algorithms incorporating a key.

Encryption can be used in its various forms to obscure the content of a message for transmission over a wagering game network, so that a third party is not so easily able to monitor network traffic and read or alter messages sent over the network. The ability of various wagering game systems to communicate with one another securely relies in many embodiments on the secure distribution or storage of keys, such as distributing a symmetric key securely to both parties wishing to use the key for secure communication, or distributing asymmetric keys such as public keys in a manner such that the identity of the public key owners can be firmly established. This is achieved in some embodiments by establishing chain of trust from one trusted system to another, so that once a single system is declared to be authentic and trustworthy, it can "vouch" for other systems such as by authenticating their public keys, user-unique identifiers, asymmetric keys, or other such data.

Key management is therefore also an important aspect of implementing encryption technology in many applications. Periodically changing or rotating encryption keys over time reduces the amount of time a cheat has to try to derive or calculate a secret key while it is still being actively used, and reduces the amount of data available to the cheat if a key is compromised. Some systems therefore not only rotate keys, but negotiate or exchange a new encryption key each time communication is established with another party, using protocols commonly known as key exchange protocols.

In one example, a shared secret symmetric key is present in each of two systems connected to the wagering game network. The machine requesting secure communication requests a session key from a trusted third party, such as a key server on a trusted server. The key server generates a session key and encrypts two copies of it using the secret symmetric keys of the two systems wishing to communicate securely. The key server sends the encrypted keys to the first system, which decrypts the copy encrypted with its asymmetric key and sends the other copy on to the other system. The other system receives and decrypts its key, and the two systems use the session key to communicate securely. This system is able to securely deliver a session key to each of the two parties desiring a secure communications session, but requires a trusted third party that knows the secret symmetric keys of the communicating parties.

In another example of key exchange, a public key or asymmetric key algorithm is used to exchange keys between two wagering game network systems desiring a secure communications channel. A first system A can simply get the public key of another system B from a key management authority such as a trusted public key server, and encrypt a randomly generated session key using that public key. System A then sends the encrypted session key to B, which decrypts the session key using its private key, and uses the decrypted session key to communicate with system A. But, such a system is vulnerable to someone intercepting messages such as public keys and encrypted messages on the network and substituting their own messages, so that the "man in the middle" is able to intercept, read, and alter any messages sent between the two systems.

Figure 2:
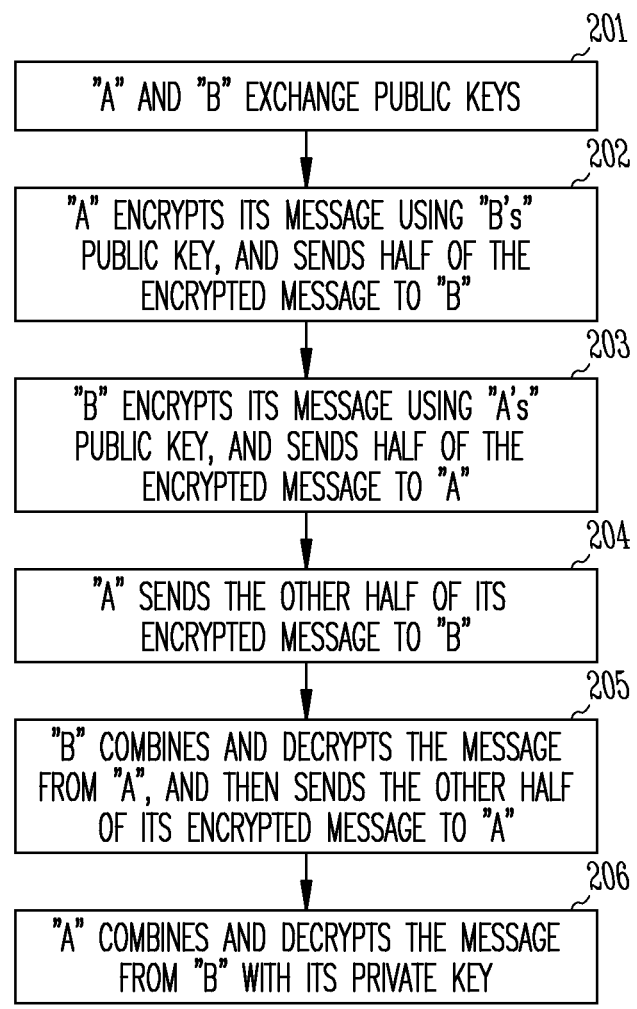
FIG. 2 is a flowchart of asymmetric public key encryption algorithm key exchange using an interlock protocol, consistent with some example embodiments of the invention.

FIG. 2 shows an example of application of an asymmetric public key encryption algorithm to key exchange using an interlock protocol, consistent with an example embodiment of the invention. The interlock protocol greatly reduces the ability of a "man in the middle" to intercept and replace messages during key exchange by splitting up the exchange into interlocking steps.

The two communicating systems A and B exchange public keys at 201, such as by publishing them in a trusted database or key management authority or by simply sending the keys to one another via a message. System A encrypts a message (the content of the message is relatively unimportant, but in some embodiments is a session key or part of a session key) using system B's public key and sends half of the encrypted message to system B at 202. System B similarly encrypts its message using system A's public key at 203, and sends half of its encrypted message to system A. At 204, system A sends the other half of its encrypted message to system B, and at 205, system B combines the two message halves and decrypts the message using its private key. System B then sends the other half of its encrypted message to system A, which receives the second half of the message at 206, and combines the two halves of the message and decrypts it using its private key.

Because half of the message is useless without the other half, and both systems have sent half of the message before either system is able to decrypt the message received from the other system, a "man in the middle" will have much more difficulty in substituting its keys and messages for those of either system A or B. In some further examples, the first half of the message contains the even numbered bits while the second half contains the odd numbered bits, so that no block of data remains intact and decryptable without both halves of the message being present. In another example, decryption is performed using a protocol with an initialization vector, which is only provided with the second half of the message. The first half of the message can also contain information such as a one-way hash of the encrypted message, while the second half of the message is the encrypted message itself.

Figure 3:
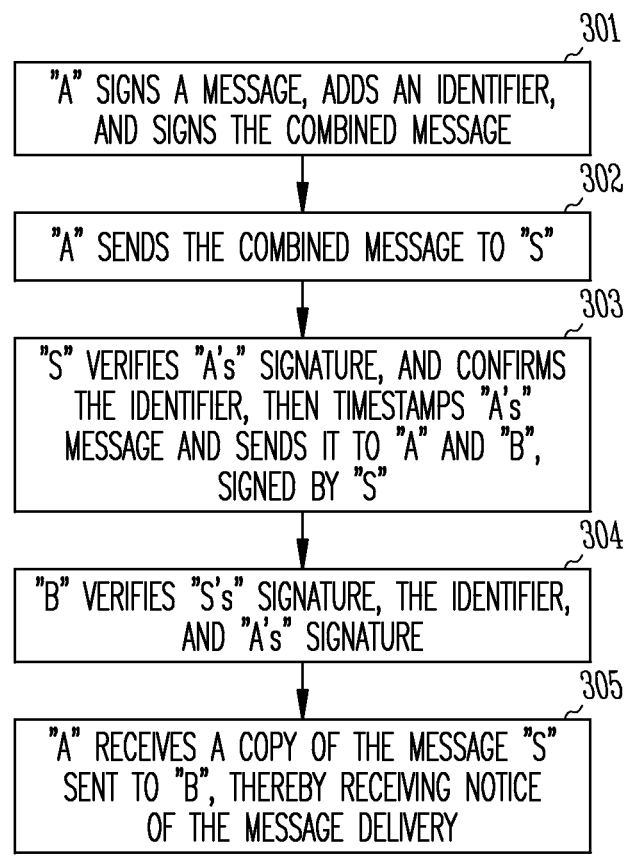
FIG. 3 is a flowchart of a method of key exchange using digital signature encryption methods, consistent with some example embodiments of the invention.

Key exchange can also be performed using digital signature encryption methods, such as is shown in the example of FIG. 3. System A signs a message at 301, but then appends an identifier to the message such as a user-unique identifier (UUID), media access control address (MAC address), processor serial number, or other such identifier. The combined message is then again digitally signed by encrypting it with system A's private key. At 302, system A sends the key to a trusted third party system S, which confirms A's signature and identifier, then timestamp's A's message and signs it before sending it to systems A and B at 303.

When system B receives the signed message, it verifies system S's signature, the identifier, and A's signature, and can further make note of the time stamp to see the age of the message. System A receives a copy of the message as well, as notification that a message was sent so that should a cheat be able to compromise system A's keys and imitate system A, system A has notice of the false message.

More simple methods of using digital signatures are sufficient for some environments, such as where a timestamp is deemed unnecessary. For example, if system A were to generate a session key, encrypt a message using the session key, and encrypt the session key using B's public key, only B can decrypt the session key and use it to read the message. This assumes that system A has access to a secure or trusted copy of B's public key, such as from a trusted key server or as provided by a technician upon installation of the system into the wagering game network. For added security system A can sign the message, the encrypted session key, or both using its public key so that system B can confirm A's identity upon receiving the encrypted message and session key by using system A's public key to decrypt the signed portion and confirm A's identity.

Figure 4:
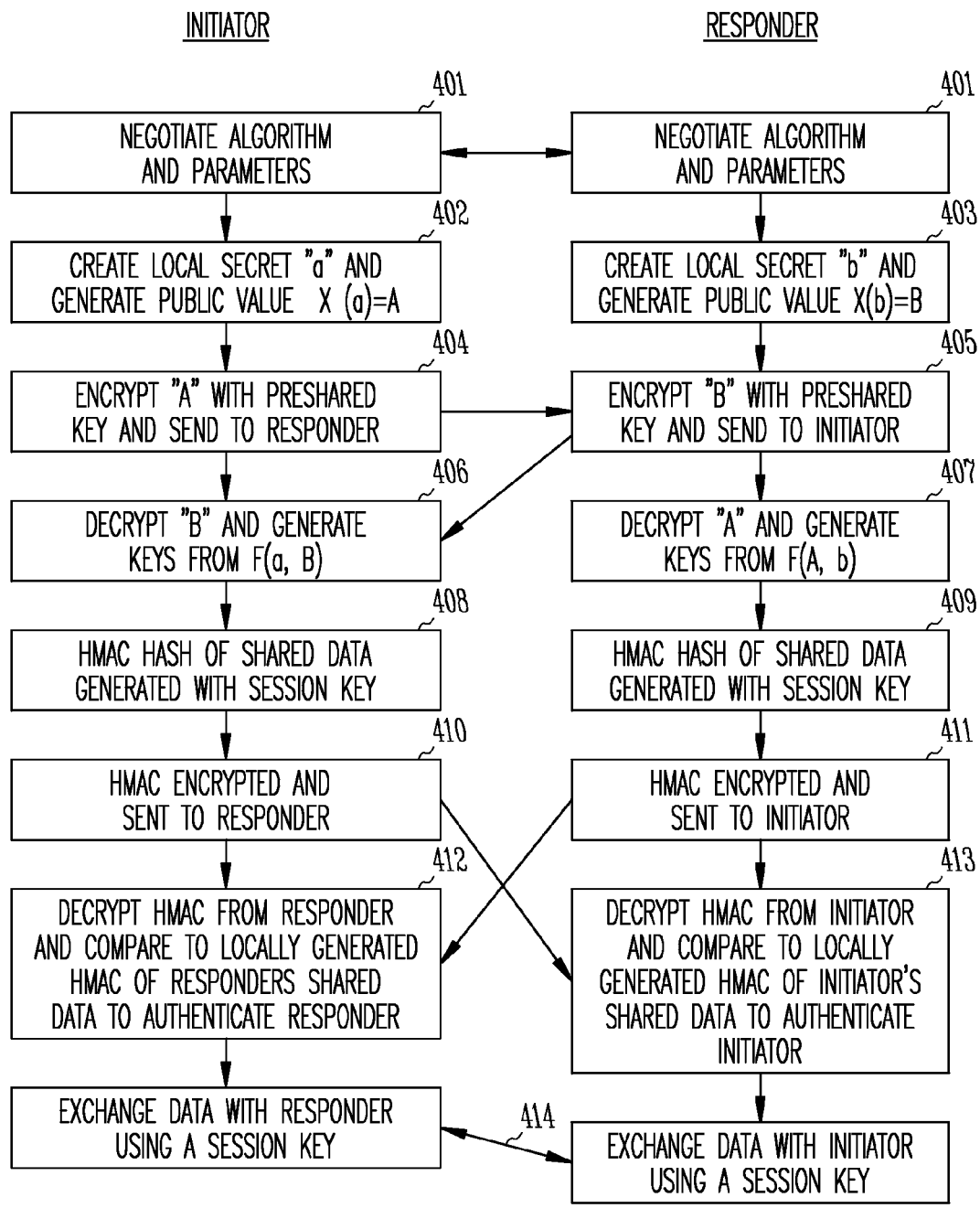
FIG. 4 is a flowchart of a method of key exchange and system authentication, consistent with some example embodiments of the invention.

FIG. 4 illustrates a key exchange algorithm using Diffie-Hellman, in which the key itself is never actually exchanged but information derived from the key is exchanged to negotiate a secure connection. The method shown in FIG. 4 shows both a key exchange and authentication stages in establishing a secure connection between two devices in a wagering game network.

The initiator and the respondent initially communicate at 401, and negotiate the algorithm and parameters to be used based on the algorithms and parameters supported by the software installed on each system. The initiator creates a local secret "a", and generates at 402 a public value x(a)=A that is a function of the locally generated secret "'a". The secret "a" can be a random number, a user-unique identifier, a secret key, or any other such secret, and in some embodiments includes time-based information to prevent a cheat from replaying the key exchange messages as part of a replay attack. The responder similarly creates a local secret "b" at 403, and generates a publicly shareable value x(b)=B such that "B" is a function of the local secret "b".

The initiator then encrypts the message "A" with a preshared encryption key and sends it to the responder at 404, and the responder encrypts the publicly shareable value "B" with the preshared encryption key and sends it to the initiator. At 406, the initiator decrypts "B", and generates one or more session keys based on the values "a" and "B" such that the keys are f(a,B). Similarly, the responder decrypts "A" at 407, and generates the same one or more session keys based on the values "A" and "b", such that the keys are f(A,b).

Because the keys cannot be recovered as a function of A and B, or as f(A,B), someone intercepting and decrypting the public values A and B will be unable to generate the same session keys generated by the initiator and respondent at 406 and 407. The result is a secure method of key exchange that doesn't require the session key itself to be sent from one system to the other, making it more difficult for a third party even with knowledge of the preshared encryption key to intercept or derive the session keys.

Some embodiments further include authentication, such as by using a message authentication code, an encryption key, and shared data known to both the initiator and respondent. At 408 and 409, both the initiator and respondent create message authentication codes such as keyed-hash message authentication codes (HMACs) of shared data using a session key generated at 406 or 407. The shared data comprises in some embodiments the same list of available encryption algorithms that was used as a parameter in the key exchange negotiation process at 401, but contains other information in alternate embodiments. The data is in some embodiments data known only to the initiator and responder, such as the previously exchanged list of available encryption algorithms or a shared secret. The shared data need not be the same data for both the initiator and responder, but can be data the responder has shared with the initiator at 408 and data the initiator has shared with the responder at 409.

The shared data is encrypted with a key shared by both the initiator and responder at 410 and 411. The HMAC produced by the initiator is encrypted and sent to the responder at 410, while the HMAC produced by the responder is encrypted and sent to the initiator at 411. Encryption of the HMAC is performed in some embodiments with a session key, such as a public key of an asymmetric key pair generated as a session key pair, but is another type of encryption key in alternate embodiments.

The initiator receives the encrypted HMAC from the responder and decrypts it at 412, and compares the HMAC to a locally generated HMAC based on the same session key, shared data, and HMAC algorithm as the responder used to generate the received HMAC. If the received HMAC and the locally generated HMAC are the same, the responder is authenticated. Similarly, the responder decrypts the HMAC received fro the initiator at 413 and compares it to a locally calculated HMAC based on the same data and algorithms, and compares it to authenticate the initiator.

Once authentication is complete, the two parties can communicate securely using one or more session keys at 414, trusting that the other party is authentic and that communication with the other party is reasonably secure.

Key exchange and authentication can therefore range from simple use of a shared secret such an asymmetric key to relatively complex algorithms where trusted third parties authenticate, time stamp, or perform other functions to further enhance communication security. Examples of other such key exchange and authentication algorithms include El Gamal, Wide-Mouth Frog, Yahalom, Needhan-Schroeder, Otway-Rees, Kerberos, Neuman-Stubblebine, Dass, Denning-Sacco, Woo-Lam, and many other such protocols using public key, symmetric key, and other encryption methods.

Sometimes, verifying the authenticity of a message is significantly more important than keeping the message secret, such as when communicating accounting information from a wagering game to a server such as when reporting credits played to a progressive area server or authenticating a jackpot amount or jackpot win message from a progressive area server, or in some methods of authenticating the identity of another device in the wagering game network. Hash functions can be used to confirm that a particular message or document has not been altered since its one-way hash function was generated, or can be combined with a key so that only someone with knowledge of the key can confirm the hash value of a particular message. Such a hash function combined with a key is called a message authentication code, or MAC, and can be used to authenticate the content of messages between users and to confirm that the sender of a message had possession of the key used to generate the message authentication code.

Consider for example a network of wagering game systems having a secret shared symmetric key or each having a symmetric key shared with a server. The key can be distributed by a wagering game technician, or can be established as a session key using key exchange and distribution methods as discussed previously. A wagering game can sign each message with a message authentication code, and the recipient can compute the same message authentication code with a one-way hash function and the secret key. By comparing the received message authentication code with the one calculated locally, the message receiver can be relatively certain the message was signed by another system having the secret key used in the message authentication code.

Figure 5:
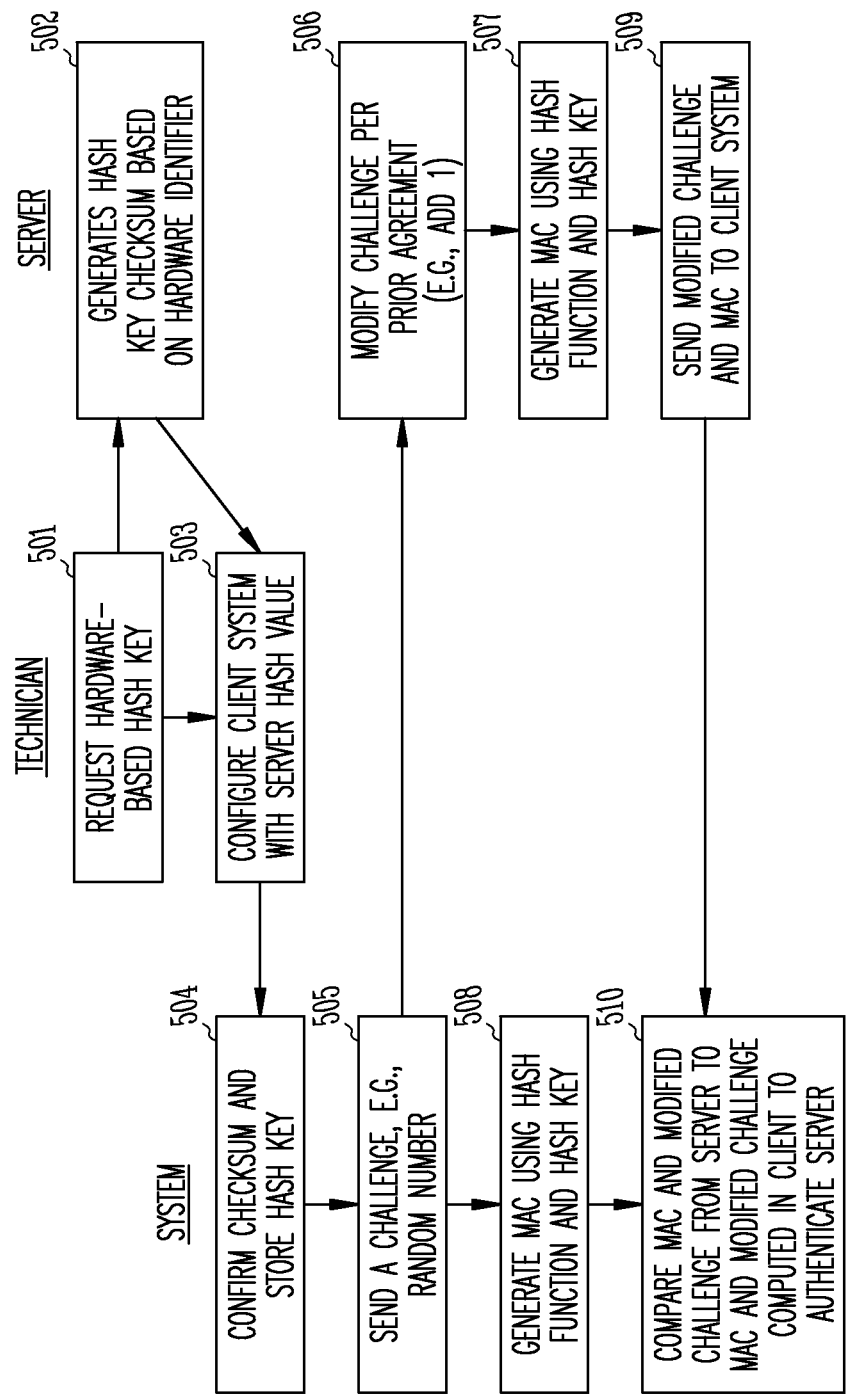
FIG. 5 is a flowchart of a method of using a message authentication code to authenticate a server on a wagering game network, consistent with some example embodiments of the invention.

FIG. 5 is a flowchart of a more detailed method of a wagering game system using a message authentication code to authenticate a server on a wagering game network. A wagering game system technician first requests at 501 a hardware-based key to use with a hash function in generating a message authentication code. The server responds by generating the key at 502 if it hasn't yet been generated, or retrieves the key if it has already been generated and stored such as by retrieving the key from secure storage in a Trusted Platform Module. The key is in some embodiments based on a hardware characteristic, such as derived from a user-unique identifier (UUID), a processor serial number, a media access control (MAC) address, or other such hardware characteristics likely to be unique.

The server sends the key to the technician at 503, such as by transferring it to a secure memory storage device such as a smartcard or USB device supporting data storage. In a further embodiment, a checksum is appended to the key and is transferred to the technician along with the key to ensure accurate transcription of the key. The technician transfers the key to the client system at 504, along with the checksum if present, and the client system receives the key and checksum at 504 and confirms that the checksum is consistent with the received key.

Once the server and client system have the same securely distributed key, either system can challenge the identity of the other system. At 505, the client system issues a challenge to the server, such as by generating a random number and sending the random number to the server as part of the challenge process. The server receives the random number and performs a predetermined operation at 506, such as adding one to the number or performing some other mathematical operation, and generates a message authentication code for the modified random number based on a one-way hash function and the shared hash key at 507. The server then sends the modified random number back to the challenging client system at 509, along with the generated message authentication code.

Meanwhile, the client system has also performed the predetermined operation on the random number sent as a challenge, and has used the hash key and the one-way hash function to generate its own message authentication code for the challenge value at 508. The client compares the message authentication code and the modified random value it generated to those received from the server at 510, and can conclude that the server is authentic and has knowledge of the secret hash key if the message authentication codes and modified random numbers match.

This solution to authentication recognizes the difficulty of distributing an initial identifier or key, and serves to illustrate how a chain of trust can be used to authenticate the identity of various systems. Were the hash key distributed in software rather than based on the hardware of the server, a potential cheat could simply obtain a copy of the software and pose as the server with no knowledge of the server or physical access to the server. Here, the technician securely distributes a shared secret key, such as one derived from hardware characteristics or randomly generated within the server system. Use of a shared secret enables authentication by confirming some aspect of the shared secret, such as confirming a keyed hash value using a secret key or decrypting a message using a secret key.

In some examples, several wagering game systems in a wagering game network can share the same secret with the server, meaning that the wagering game systems can use an authentication process such as that of FIG. 4 or 5 to authenticate its identity and establish secure communications with any other machine in the network that has the shared secret. In other examples, each system shares a different secret with the server, and the server coordinates authentication of one wagering game system to the other for communication such as was described earlier in discussing the key exchange protocols.

Implementation of encryption protocols into a wagering game system is performed in some embodiments by adoption of standards such as the Internet Protocol Security (IPSec) protocol set or another such standard. IPSec comprises a set of protocols including secure packet transmission protocols and key exchange protocols, and can therefore be used for a variety of encryption functions such as secure communication, authentication, and key management. IPSec works on the network connection of a computer system, so it has the ability to encrypt or protect packets sent over the network whatever their content. IPSec also includes the key exchange protocol known as Internet Key Exchange (IKE), which is used to establish a secure association for encrypted packet exchange between two or more systems. IKE uses a Diffie-Hellman based key exchange to set up a shared session secret, from which cryptographic keys are derived. Either preshared secrets or public key methods as described earlier are used to mutually authenticate communicating parties, such that the identity of a party can be confirmed before establishing a session key.

More simple protocols such as Secure Socket Layer (SSL) can also be used to provide system authentication and encryption of network data. SSL includes a negotiation element in which the communicating parties negotiate which encryption standards will be used. Supported options include public key algorithms such as RSA and Diffie-Hellman, symmetric key algorithms such as RC4, IDEA, DES, AES, and hash functions such as MD5 and SHA. It further supports message authentication codes, and is commonly used to support secure communication for electronic commerce conducted over the Internet. SSH is typically implemented in the session or transport layers of a network stack, and so is capable of providing encryption services to a network connection independent of the specific application requesting network communication.

Key management includes certificate management in a further embodiment, such as where the security module is operable to authenticate a certificate to establish trust in an encryption key embedded therein. Authentication of the certificate is performed via a certificate authority's certificate, which is trusted through manual confirmation of the authenticity of the certificate authority's certificate such as manual confirmation of a known hash value of the certificate authority's certificate. The invention in one such example uses encryption methods to ensure secure communication between network devices by establishing trust in encryption keys embedded in certificates. A security module in the wagering game system or server is operable to authenticate a certificate to establish trust in an encryption key embedded therein, such that the encryption key can be trusted as belonging to the identified owner. Authentication of the certificate is performed via a certificate authority's certificate, which is trusted in some embodiments through manual confirmation of the authenticity of the certificate authority's certificate such as manual confirmation of a known hash value of the certificate authority's certificate.

Use of encryption once trust or authenticity are established in a wagering game network takes different forms in varying embodiments of the invention, including but not limited to use of various symmetric algorithms, public key algorithms, and one-way hash functions. Various embodiments of the invention rely on algorithms such as these being implemented in hardware or in software in the wagering game systems and in other systems such as servers or controllers, such as within a software driver executing on each system in the wagering game network. Further embodiments encrypt network data sent between two wagering game systems using a protocol that operates on the network interface level, such as SSL or Secure Socket Layer, which is a secure protocol that supports a variety of encryption algorithms and functions, or IPSec, which includes encryption, authentication, and key management protocols. Every packet of information that is exchanged between two systems can be encrypted after a secure connection is established using a network security protocol such as these, making them particularly well-suited for certain wagering game system network environments.

As previously discussed, encryption can be used in its various forms to obscure the content of a message for transmission over a wagering game network, so that a third party is not so easily able to monitor network traffic and read or alter messages sent over the network. The ability of various wagering game systems to communicate with one another securely relies in many embodiments on the secure distribution or storage of keys, such as distributing asymmetric keys such as public keys in a manner such that the identity of the public key owners can be firmly established. This is achieved in some embodiments by establishing chain of trust from one trusted system to another, so that once a single system is declared to be authentic and trustworthy, it can "vouch" for other systems such as by authenticating their public keys, user-unique identifiers, asymmetric keys, or other such data.

Such methods of key management are often handled via a trusted third party known as a Certificate Authority, which is a service provider that signs certificates carrying public keys and identification information as a means of authenticating the data contained in the certificate to other parties. The certificate authority is typically a party well-known and trusted to all involved, and in some environments such as Internet web pages is preconfigured as a trusted authority in web browsers before distribution.

FIG. 6 illustrates the content of a typical X.509 standard compliant certificate, including identification information and a digital signature authenticating the information contained therein. The certificate contains a version identifier indicating which set of certificate standards were used in assembling the certificate at 601, and fields identifying the algorithm used to digitally sign the certificate at 602. the certificate authority, or trusted third party signing the certificate is identified at 603, including a variety of fields useful in identifying or contacting the certificate authority.

The certificate's period of validity is specified at 604, and is typically based on cost, the level of security desired, and other factors. The subject of the certificate is identified at 605, identifying the entity whose public key is being conveyed via the certificate and other information such as the internet address and contact information for the entity. The subject's public key and information regarding the type of encryption algorithm used to create the public key are shown at 606, and an encrypted digital signature incorporating a hash algorithm from the certificate authority vouching for the authenticity of the other data contained in the certificate is shown at 607.

In use, the subject is able to provide the certificate to other parties, who can use their previous knowledge and trust of the certificate authority to accept the authenticity of the certificate's contents, including the certificate owner and the owner's public key. The certificate authority's own certificate is thereby used as a root of trust, through which the certificate authority can vouch for other certificates and subjects through digitally signing the subject's certificates.

For example, consider a wagering game manufacturer that wishes to ensure secure communications between gaming devices and a server. The manufacturer generates a public key/private key encryption pair, and applies to a certificate authority to have its public key signed. The certificate authority creates a certificate like that of FIG. 6 containing the wagering game server's public key and identification information, and provides the certificate to the wagering game system manufacturer. In another example, the wagering game manufacturer, a gaming regulation board, or another such entity acts as its own certificate authority, and issues signed certificates to wagering game servers or other systems. The signed certificate generated for the wagering game server is then distributed to gaming devices such as the computerized reel slot machine of FIG. 1, which can authenticate the certificate based on the wagering game machine's trust of the certificate authority. Once the certificate is deemed trusted based on authentication of the digital signature, the wagering game system can use the public key embedded in the certificate to communicate securely with the wagering game server.

The certificate of FIG. 6 contains an RSA public key as shown at 606, owned by the subject identified at 605. The RSA public key can be used to encrypt a message sent to the subject, or can be used to confirm an RSA digital signature of the subject to ensure that communication to and from the subject is authentic and secure. The certificate is signed by use of an MD5 hash value, encrypted with the certificate authority's private RSA encryption key. The authenticity of the certificate can therefore be confirmed by decrypting the hash value using the certificate authority's known public key, such as is typically built into web browsers, is otherwise distributed so widely it is inherently trusted, or as is otherwise securely delivered in a trustworthy manner. Once the hash value is decrypted, it can be compared to a computed hash of the certificate, such that if the hash values match the certificate is known to be unaltered since being signed by the certificate authority.

Figure 7:
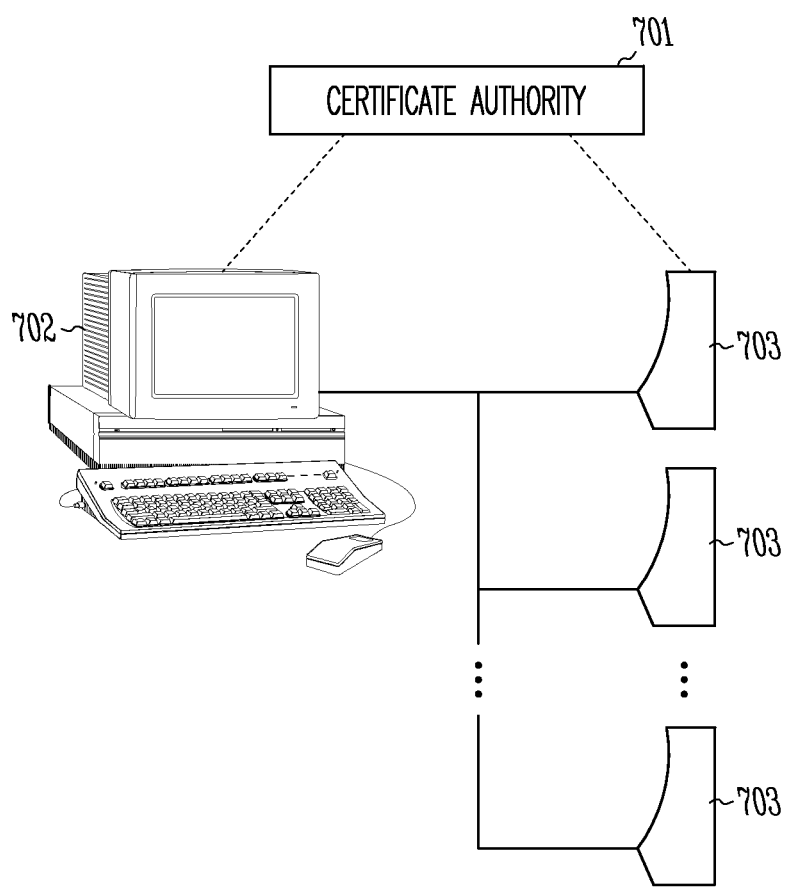
FIG. 7 is a block diagram illustrating a wagering game network and a certificate management structure, consistent with some example embodiments of the invention.

A more detailed example of incorporation of certificates in a wagering game system is shown in FIG. 7. Because the wagering game system manufacturer desires in this example only to authenticate one component of its system to another, it acts as its own certificate authority. In other examples, publicly known and trusted certificate authorities such as Verisign or Thwate are relied upon to sign a certificate such as the manufacturer's certificate, extending the root of trust beyond the manufacturer. In still another example, a particular casino or gaming authority such as the State of Nevada's Gaming Board will sign a manufacturer's certificate, acting as a link in the chain of trust.

The certificate authority 701 first makes known its public key, such as by publishing it to software designed to facilitate secure communication between wagering game system components or by publishing it such that it is widely or freely available. In this example, the back-end server system 701 has a certificate signed by the certificate authority, and the wagering game machines 702 also have a common certificate signed by the certificate authority and shared by every wagering game system on the network.

The wagering game devices 703 are desirably able to authenticate communication with the back-end server 702, so that information such as accounting information, configuration or game changes, progressive game progress, and other such data communicated via the network is known to be authentic. One example of a process using certificates for authentication in the wagering game system of FIG. 3 is shown in the flowchart of FIG. 4.

The backend server 702 generates or receives a public key/private key pair of keys, and has the certificate authority 701 create a certificate, vouching for the authenticity of the public key. The wagering game devices 703 similarly have the certificate authority provide a certificate including a public key, and store the corresponding private key. In this example, the secrecy of the back-end server's private key is of particular concern, as compromising the key would enable a cheat to act as though it were the back-end server and to exercise some degree of control over the wagering games 703.

In some embodiments, the private key is kept securely in the back-end server via a component known as a Trusted Platform Module, that prevents a cheat from examining hardware settings or software code to steal the private key. The back-end server key pair is generated in the server during the installation process in some embodiments, greatly reducing the risk that a cheat could obtain the private key used by intercepting the server before installation. When the keys are generated during the installation process, the keys and related certificates are stored in nonvolatile memory on systems not having a Trusted Platform Module, but because the keys and certificates are generated locally they will often not include a certificate generated by a pre-trusted certificate authority for authentication of the distributed public key.

Figure 8:
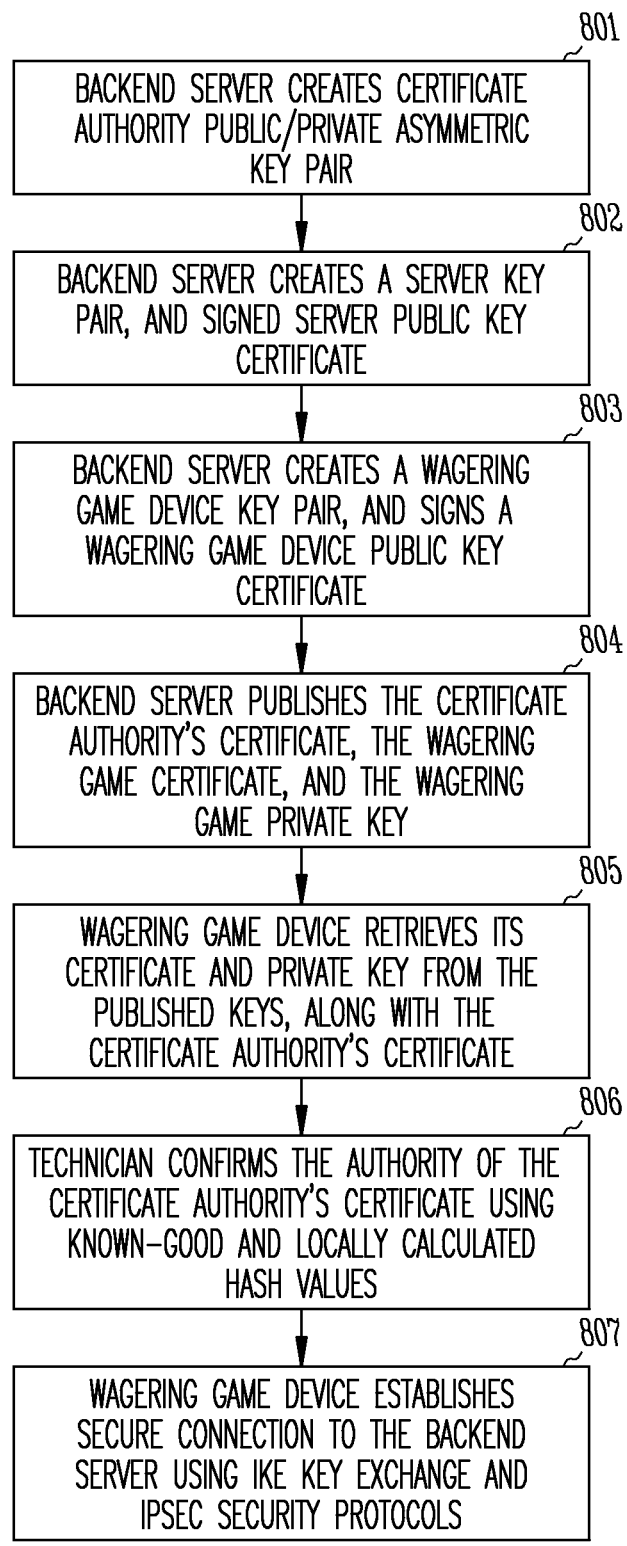
FIG. 8 is a flowchart of a method of using certificates to ensure secure communication between a back-end server and wagering game systems, consistent with some example embodiments of the invention.

To solve the problem of authenticating the server's public key to the gaming devices, the backend server authenticates its own gaming device communication keys by creating a certificate, and creates and signs a certificate for the wagering game devices 703 as well. FIG. 8 is a flowchart of a method of using certificates to ensure secure communication between a back-end server and wagering game systems, consistent with some example embodiments of the invention. The backend server therefore creates three key pairs and signs the public keys of two pairs in this example—a certificate authority key pair used to sign other key pairs at 801, a key pair and signed certificate for the back-end server to communicate over the network with gaming devices at 802, and a key pair and signed certificate for the gaming devices to share in communicating with the back-end server at 803.

The backend server publishes the certificate authority's certificate, the wagering game machine's certificate, and the wagering game device's public key at 804. This information is published to a domain name server in some embodiments, or to another server such as a key server. The wagering game device's private key is not published in alternate embodiments, but is conveyed to the wagering game machines via a network connection or through technician intervention such as by use of a smart card, USB flash drive, or other mechanism.

The wagering game device retrieves the published certificates and keys at 805, including its own private key in this example embodiment. This is permitted, as the authenticity of the wagering game machine itself is not of concern in this example but the authenticity of the back-end server is important. In an alternate embodiment, the wagering game device's private key is obtained in the wagering game device through other means. The wagering game device then stores its private key, stores its certificate for sharing with other devices, and stores the certificate authority's certificate for authenticating the certificate authority's signature. In some embodiments, the wagering game system checks its own certificate using the certificate authority's public key to ensure that the certificates and the private key received are consistent.

In an alternate example, a trusted platform module is available on the server and in the wagering game devices, and can be used for key generation and storage. In one such example, the server's trusted platform module is used to generate the certificate authority and server keys, but is not used to generate the wagering game device's key pair since the private key can't be easily extracted from the trusted platform module for transfer to the wagering game devices. In an alternate embodiment, the server's trusted platform module does generate the wagering game device keys, which are securely transferred to the wagering game devices such as by use of a secure portable memory such as a smart card or flash drive device.

The gaming device generates its own key pair in other embodiments, and the public key created in the gaming device is securely conveyed to the server so that it can sign the public key and create a trusted X.509 certificate, which can then be made publicly available to all systems on the network to facilitate future secure and authenticated communication.

Returning to the example of FIG. 8, in which the keys and certificates are generated in the server, the technician intervenes in the process at 806 to manually confirm the authenticity of the certificate authority's certificate as received in the wagering game machine. This is achieved in this embodiment by generation of a hash value, such as by using an MD5 or other hash algorithm, of the certificate authority's certificate at the backend server, and manually comparing the hash value observed at the server to a hash value calculated in each wagering game machine. Once the hash values are confirmed to be the same, the certificate authority's certificate can be accepted as authentic, such as by the technician following an on-screen prompt to confirm the calculated hash value. This is achieved in another example embodiment by the technician conveying the certificate authority's certificate from the backend server to each wagering game machine on installation, or by using some other means of securely or reliably conveying the certificate authority's certificate to each of the wagering game machines. In yet a further example, the technician views the actual certificate, such as via a printed copy or portable electronic device, and confirms that it matches the certificate received in the wagering game device.

The gaming device is then able to locate and initiate communication with the backend server at 807, including exchange of certificates such as via the standard Diffie-Hellman Internet Key Exchange protocol. The authenticity of the exchanged certificates can be confirmed by checking them with the certificate authority's public certificate, which is now trusted by both parties.

Establishment of a secure communications channel at this point varies from embodiment to embodiment, but includes such features as validating exchanged certificates using the certificate authority's certificate, exchanging signed messages and confirming the signatures at the receiving end using the exchanged certificates, and negotiating a secure channel such as by using an IPSec security association protocol. Establishment of session keys, or unique encryption keys for a particular communications session, ensures the authenticity and secrecy of the information being exchanged, and is typically a part of a secure channel negotiation protocol such as IPSec.

The security of the connection between the wagering game devices and the backend server is therefore authenticated from the viewpoint of the wagering game devices. In this example, the authenticity of the wagering game devices has not been authenticated to the server due to the public availability of the wagering game device's private key, but the authenticity of the gaming devices is not an issue in such examples. In other examples, such as where a backend server records gaming progress of a pool of progressive slot machines, the wagering game devices could be impersonated to the advantage of a game player, and so the wagering game machine's private keys are conveyed securely such as via a technician.

Figure 9:
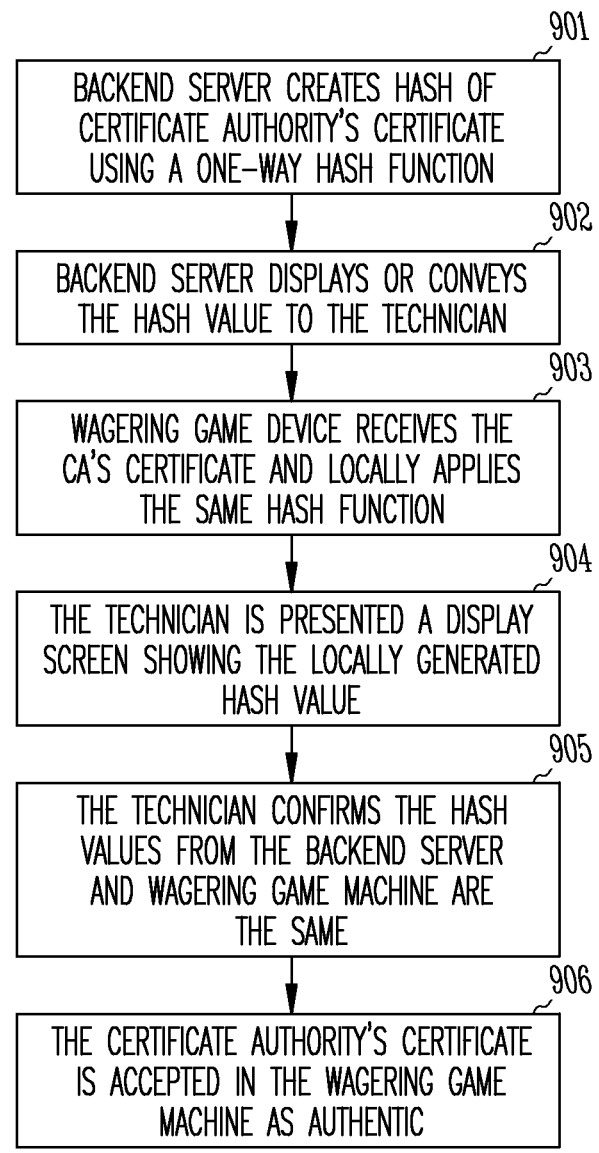
FIG. 9 is a flowchart of a method of manually confirming trust in a certificate authority's certificate in a wagering game machine, consistent with some example embodiments of the invention.

The technician's role in the example of FIG. 8 is an important element in establishing trust in the certificate authority's certificate, and is shown in greater detail in FIG. 9. Once the backend server has created or received a certificate authority key pair and has generated or received a certificate authority certificate, a hash value of the certificate is calculated using a one-way hash function at 901. The backend server then displays or conveys the result of the hash function to the wagering game technician at 902, such as by displaying a hexadecimal alphanumeric string of characters on the screen. The technician is then able to make note of the hash value, and use it for comparison purposes later to ensure that a certificate is the same as the certificate authority certificate stored in the backend server.

The wagering game system receives the certificate authority's certificate at 903, and applies the same hash function as used in the backend server at 901 to the received certificate. Because the hash function is the same, and because it is extremely difficult to forge a certificate that will generate a given hash result when an appropriate one-way hash function is used, identical hash values virtually guarantee that the certificates are the same. The technician therefore is presented the hash value calculated in the wagering game machine at 904, such as by displaying the computed hash value on the wagering game system's display, and confirms that the hash value generated in the wagering game machine matches the hash value observed at the backend server at 905.

Confirmation comprises in one embodiment use of a service or configuration screen on the wagering game system, which prompts the technician to compare the hash value generated in the wagering game machine to the hash value computed and presented from the backend server. Once the technician has confirmed that the hash values match, the certificate authority's certificate is accepted in the wagering game machine as authentic at 906, and is stored such as in nonvolatile memory, a Trusted Platform Module, or is otherwise stored for later use.

This example shows how a root of trust, such as a certificate authority's certificate, can be used in a wagering game system network to provide the wagering game systems and servers on the network the ability to securely communicate. The root of trust in the example given must be trusted in all devices wishing to securely communicate, and so is confirmed as being authentic in the wagering game systems using a manual technician intervention as explained in FIG. 9. The root of trust is here used to facilitate operation of a key exchange protocol by enabling use of signed certificates to securely exchange data between systems, which in one further example is the Internet Key Exchange protocol, or IKE. In a still further embodiment, session keys used to encrypt and decrypt data exchanged in a given communication session are exchanged using the key exchange protocol, which facilitates operation of a secure channel such as an IPSec secure communications channel. A variety of further examples of key exchange, certificate management, and session encryption, such as those previously discussed, can be applied to or combined with elements of the method of FIG. 9 in various alternate embodiments.

In one such example, Internet Protocol Security (IPSec) protocol set or another such standard. IPSec comprises a set of protocols including secure packet transmission protocols and key exchange protocols, and can therefore be used for a variety of encryption functions such as secure communication, authentication, and key management. IPSec works on the network layer of a computer system, so it has the ability to encrypt or protect packets sent over the network whatever their content. IPSec also includes the key exchange protocol known as Internet Key Exchange (IKE), which is used to establish a secure association for encrypted packet exchange between two or more systems. IKE uses a Diffie-Hellman based key exchange to set up a shared session secret, from which cryptographic keys are derived. The authenticated certificates or other methods such as other preshared secrets or public key methods as described earlier are used to mutually authenticate communicating parties, such that the identity of a party can be confirmed before establishing a session key.

Other protocols such as Secure Socket Layer (SSL) can also be used to provide system authentication and encryption of network data in alternate embodiments. SSL includes a negotiation element in which the communicating parties negotiate which encryption standards will be used. Supported options include public key algorithms such as RSA and Diffie-Hellman, symmetric key algorithms such as RC4, IDEA, DES, AES, and has functions such as MD5 and SHA. It further supports message authentication codes, and is commonly used to support secure communication for electronic commerce conducted over the Internet. SSH is typically implemented in the session or transport layers of a network stack, and so is capable of providing encryption services to a network connection independent of the specific application requesting network communication.

In a further example, at least some wagering game machines in a wagering game network have one or more certificates from one or more administrative organizations pre-loaded in the system. The administrative organization's certificate is in some such examples considered a root certificate, and is inherently trusted and can be used to establish trust in other certificates or messages. The administrative organization in such cases will likely be an organization charged with some role in managing the wagering game systems, such as the wagering game system manufacturer, a casino or other wagering game establishment owner or operator, or a regulatory authority such as the Nevada state gaming board.

The certificates can be pre-loaded in some embodiments by storing them in a trusted platform module during manufacture or initial configuration, or can be stored through other means such as by preprogramming a read-only memory in the wagering game systems. These trusted root certificate examples enable the wagering game machines to recognize and confirm the authenticity of messages signed by or encrypted by the root certificate owner, and enable recognition and trust of other certificates signed by the root certificate owner. In a more sophisticated example, a preloaded root certificate from the wagering game manufacturer is used to establish trust in a casino owner certificate signed by the game manufacturer, and the casino's certificate is used or a limited period of time to sign certificates assigned to a variety of servers and wagering game machines in the casino. Each system can trust the other, because the casino owner's signature present in each machine's certificate can be authenticated back to the wagering game manufacturer's certificate, which is inherently trusted in each machine. Similarly, secure communications channels can be negotiated, new software can be downloaded, and other network communications can be secured or authenticated using the chain of trust established back to the administrative organization's certificate serving as a preconfigured root of trust.

These examples illustrate how key management, data encryption, authentication, certificate management, and other encryption methods can be used to provide greater security in a wagering game network. The security of communication and authentication of communicating parties reduces the risk that a cheat will be able to intercept, alter, or change information communicated between wagering game systems in a wagering game network, thereby reducing the risk that an intruder will be able to interfere with the normal operation of the wagering game network or those devices relying on the network to operate properly.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of configuring a security mechanism at a wagering game machine, the method comprising:
  accessing, from one or more memory devices in the wagering game machine, an unauthenticated wagering game certificate;
  determining, by at least one of one or more processors in the wagering game machine, a first hash value of the unauthenticated wagering game certificate;
  presenting, via a display device of the wagering game machine, the first hash value to a wagering game machine operator;
  presenting, to the wagering game machine operator via the display device of the wagering game machine, a prompt to confirm that the first hash value matches a second hash value of a trusted wagering game certificate previously calculated by a wagering game server:
  receiving, from the wagering game machine operator via an input device of the wagering game machine, a confirmation that the first hash value matches the second hash value;
  authenticating, via at least one of the one or more processors, the unauthenticated wagering game certificate based on the confirmation received from the wagering game operator; and
  enabling, via at least one of the one or more processors and based on authenticating the unauthenticated wagering game certificate, the wagering game machine to communicate securely over a communications network.

2. The method of claim 1, wherein determining the first and second hash values is performed using an MD5 bash algorithm.

3. The method of claim 1, wherein determining the first and second hash values are performed using an SHA hash algorithm.

4. The method of claim 1, wherein the trusted wagering game certificate is issued by a publicly available certificate authority.

5. The method of claim 1, wherein the trusted wagering game certificate is issued by a gaming authority.

6. The method of claim 1, wherein the trusted wagering game certificate is issued by the wagering game server.

7. The method of claim 1, wherein the unauthenticated wagering game certificate comprises a wagering game server public encryption key, and wherein the method further comprises using the wagering game server public encryption key to securely communicate with the wagering game server after authenticating the unauthenticated wagering game certificate based on the confirmation.

8. The method of claim 1, further comprising:
  after authenticating the unauthenticated wagering game certificate, transmitting subsequent certificates between the wagering game machine and the wagering game server; and
  using a Diffie-Hellman Internet Key Exchange protocol to cross-authenticate the subsequent certificates.

9. The method of claim 1, wherein accessing the trusted wagering game certificate comprises:
  accessing a domain name server; and
  retrieving the trusted wagering game certificate from the domain name server.

10. A non-transitory computer-readable medium comprising instructions which, when executed by at least one of one or more processors, cause a wagering game machine to:
  access an unauthenticated wagering game certificate stored in the wagering game machine;
  calculate a first hash value of the unauthenticated wagering game certificate;
  present, via at least one of one or more display devices of the wagering game machine, at least a portion of the first hash value to a wagering game machine operator;
  present, via at least one of the one or more display devices of the wagering game machine and to the wagering game machine operator, a prompt to confirm that the presented portion of the first hash value matches a corresponding portion of a second hash value of a trusted wagering game certificate calculated by a wagering game server;

receive, via an input device of the wagering game machine, a confirmation from the wagering game machine operator that the presented portion of the first hash value matches the corresponding portion of the second hash value;

authenticate the unauthenticated wagering game certificate based on the confirmation; and enable, based on authenticating the unauthenticated wagering game certificate, the wagering game machine to communicate securely over a communications network.

11. The non-transitory computer-readable medium of claim 10, wherein the instructions further cause the wagering game machine to calculate the first hash value using an MD5 hash algorithm.

12. The non-transitory computer-readable medium of claim 10, wherein the trusted wagering game certificate is issued by a gaming authority.

13. The non-transitory computer-readable medium of claim 10, wherein the trusted wagering game certificate is issued by a publicly available certificate authority.

14. The non-transitory computer-readable medium of claim 10, wherein the trusted wagering game certificate is issued by the wagering game server.

15. The non-transitory computer-readable medium of claim 10, wherein the unauthenticated wagering game certificate comprises a wagering game server public encryption key, and wherein the instructions further cause the wagering game machine to use the wagering game server public encryption key to securely communicate with the wagering game server after authenticating the unauthenticated wagering game certificate.

16. The non-transitory computer-readable medium of claim 10, wherein the instructions further cause the wagering game machine to:

after authenticating the unauthenticated wagering game certificate, receive a subsequent wagering game certificate from the wagering game server; and use a Diffie-Hellman Internet Key Exchange protocol to authenticate the subsequent wagering game certificate.

17. The non-transitory computer-readable medium of claim 10, wherein the instructions further cause the wagering game machine to:

access a domain name server; and retrieve the trusted wagering game certificate from the domain name server.

18. A wagering game system comprising:

one or more processors;

a wagering game server; and a wagering game client device comprising:
  a display device,
  an input device, and
  one or more memory devices storing instructions that, when executed by at least one of the one or more processors, cause the wagering game client device to:
    access an unauthenticated wagering game certificate;
    determine, via at least one of the one or more processors, a hash value of the unauthenticated wagering game certificate;
    present, via the display device, the hash value to a wagering game machine operator;
    present, to the wagering game machine operator via the input device, a prompt to confirm that the hash value matches a separate hash value previously calculated by the wagering game server;
    receive, from the wagering game machine operator via the input device, a confirmation that the hash value matches the separate hash value previously calculated by the wagering game server;
    authenticate, via at least one or the one or more processors, the unauthenticated wagering game certificate based on the confirmation; and
    enable, via at least one of the one or more processors and based on authenticating the unauthenticated wagering game certificate, the wagering game machine to communicate securely over a communications network.

19. The wagering game system of claim 18, wherein the wagering game server is further configured to provide the hash value previously calculated to the technician by displaying the hash value previously calculated on another display device associated with the wagering game server.

20. The wagering game system of claim 19, wherein the hash value previously calculated is displayed on the another display device associated with the wagering game server and the hash value is displayed on the display device of the wagering game client device concurrently.

21. The wagering game system of claim 18, wherein the wagering game server is further configured to provide the hash value previously calculated to the technician by printing the wagering game server security certificate.

22. The wagering game system of claim 18, wherein the wagering game server security certificate is issued by the wagering game server.

23. The wagering game system of claim 18, wherein the wagering game server is further configured to serve a wagering game on which monetary value can be wagered to the wagering game client device.

24. The wagering game system of claim 18, wherein the instructions further cause the wagering game client device to:

store the wagering game certificate when hash value is confirmed as matching the hash value previously calculated.

* * * * *